US012501213B2

(12) United States Patent
Joo

(10) Patent No.: US 12,501,213 B2
(45) Date of Patent: Dec. 16, 2025

(54) HOWLING REMOVAL SYSTEM AND METHOD, AND COMPUTER PROGRAM THEREFOR

(71) Applicant: Minkyoo Joo, Seoul (KR)

(72) Inventor: Minkyoo Joo, Seoul (KR)

( * ) Notice: Subject to any disclaimer, the term of this patent is extended or adjusted under 35 U.S.C. 154(b) by 230 days.

(21) Appl. No.: 18/506,809

(22) Filed: Nov. 10, 2023

(65) Prior Publication Data

US 2025/0159407 A1 May 15, 2025

(51) Int. Cl.

*H04R 3/02* (2006.01)
*H04R 3/00* (2006.01)
*H04R 29/00* (2006.01)

(52) U.S. Cl.

CPC ............... *H04R 3/02* (2013.01); *H04R 3/005* (2013.01); *H04R 29/005* (2013.01)

(58) Field of Classification Search

CPC ........ G10K 11/17819; G10K 2210/506; G10L 21/02; H04N 7/15; H04R 2227/003; H04R 27/00; H04R 29/005; H04R 29/007; H04R 3/005; H04R 3/02
USPC ................................. 381/56–58, 92; 700/94
See application file for complete search history.

(56) References Cited

U.S. PATENT DOCUMENTS 7,991,163 B2 * 8/2011 Loether .................. H04R 27/00 381/26
9,749,473 B2 * 8/2017 Eckert ....................... H04S 5/00
2003/0081115 A1 * 5/2003 Curry ....................... H04N 7/15 381/26
2006/0210091 A1 * 9/2006 Okumura ................. H04R 3/02 381/71.11
2012/0140949 A1 * 6/2012 Chen ..................... H04M 3/561 381/93
2022/0232334 A1 * 7/2022 Goff .......................... G06F 3/16
2023/0254640 A1 * 8/2023 Suetsugu ................. H04R 3/02 381/93
2024/0381026 A1 * 11/2024 Blais ...................... H04R 3/005

FOREIGN PATENT DOCUMENTS

KR 10-2009-0110069 10/2009
KR 10-0934486 12/2009
KR 10-2016-0085985 7/2016
KR 10-2017-0072783 6/2017
KR 10-2019-0025314 3/2019

* cited by examiner

*Primary Examiner* — Lun-See Lao
(74) *Attorney, Agent, or Firm* — Fish & Richardson P.C.

(57) ABSTRACT

A howling removal system includes an output unit configured to output a detection signal through any one of a plurality of user terminals connected to a voice communication session, each equipped with a microphone; a detection unit configured to detect a combination of user terminals among the plurality of user terminals in which howling occurs based on sound signals collected from the plurality of terminals through the voice communication session; and a control unit configured to turn off the microphone of one or more user terminals included in the combination of user terminals.

11 Claims, 4 Drawing Sheets

HOWLING REMOVAL SYSTEM AND METHOD, AND COMPUTER PROGRAM THEREFOR

TECHNICAL FIELD

The present disclosure pertains to the field of audio signal processing and communication systems. Specifically, it addresses the development of a howling removal system and method with the objective of reducing or eliminating howling and feedback in audio communication systems, such as those used in video conferences, teleconferences, and other real-time audio communication environments. Furthermore, an aspect of the present disclosure provides a computer program designed to facilitate the implementation of the howling removal method in conjunction with hardware, leveraging signals within the inaudible frequency band for the purpose of detecting and mitigating howling.

BACKGROUND

Howling occurs when sound input, such as from a microphone, undergoes amplification and is then output through a speaker. In this process, a portion of the output sound gets captured again by the input device, creating a repetitive cycle. This phenomenon often leads to the amplification of specific frequency sounds, resulting in repetitive sound patterns, often referred to as 'echo,' or interference due to resonance.

The significance of remote work during the COVID-19 pandemic has brought increased attention to audio and video-based multi-user conferencing services. In these scenarios, multiple participants, located in the same physical space, use their communication devices' microphones.

In such situations, when several microphones capture sound from a single speaker with slight time differences, it can lead to howling, causing repeated sound patterns or the generation of high-frequency noise.

To prevent howling, adjustments can be made to the spatial environment. This includes optimizing the placement of speakers and microphones, considering the material of room surfaces, and managing electrical-acoustic factors such as amplification levels and equalizer settings.

In conventional methods for howling removal, while this US patent primarily addresses the issue of howling in audio communication systems, it's worth noting that similar challenges have been addressed in the Korean patent (Public Patent Bulletin No. 10-2017-0072783). The Korean patent introduces channel-state-adaptive audio mixing techniques aimed at excluding voice data from conference terminals experiencing echoes or excessive noise.

However, the technology disclosed in the Korean patent (Public Patent Bulletin No. 10-2017-0072783) simply excludes the audio from channels where howling occurs, which can disrupt multi-party conferences. Furthermore, it has limitations as it cannot confirm the cause of howling in the environment where howling occurred, even after the howling's cause has been eliminated.

SUMMARY

According to one aspect of the present disclosure aimed at solving the problems of the prior art, it is possible to provide a howling removal system and method, as well as a computer program therefor, that can detect combinations of terminals in an environment where multiple users engage in voice communication, such as voice or video conferences, and howling occurs using signals in the inaudible frequency band. The system can then turn off the microphones of one or more terminals in a combination where howling occurs based on predetermined criteria and perform continuous howling detection using signals in the inaudible frequency band.

According to one aspect of the present disclosure, a howling removal system includes an output unit configured to output a detection signal through one of multiple user terminals, each equipped with a microphone and connected to a voice communication session. It further includes a detection unit configured to detect a combination of user terminals among the multiple user terminals in which howling occurs based on sound signals collected from the multiple terminals through the voice communication session. Additionally, a control unit is included, configured to turn off the microphones of one or more user terminals included in the combination of user terminals.

In this case, the detection signal includes signals in the inaudible frequency band, and the control unit is further configured to control the microphones of the user terminals as if they were turned off for the audible frequency band while allowing sounds in the inaudible frequency band to be input.

In one embodiment, the control unit is further configured to control the output unit to sequentially output the detection signals through the plurality of user terminals at predetermined intervals.

In one embodiment, the control unit receives predefined environmental change information from the voice communication session and is further configured to control the output unit to output the detection signal through one or more of the user terminals in response to the received environmental change information.

In one embodiment, the howling removal system determines the priority of user terminals included in the combination of user terminals based on connection information to the voice communication session and previously stored user information. It includes the step of deactivating the microphones of user terminals that have relatively lower priorities.

In one embodiment, a howling removal system is provided, which includes a storage unit configured to temporarily store received voice information from the user terminals. In this case, when a user input for state transition is received from the user terminals with microphones turned off, the howling removal system checks whether howling occurs in the combination of user terminals, including the user terminals with microphones turned off, through the detection unit. After this checking step, the system includes transmitting delayed audio to the voice communication session using the stored voice information.

One aspect of the present disclosure provides a howling removal method, comprising the steps of: the howling removal system outputting a detection signal through one of multiple user terminals, each equipped with a microphone and connected to a voice communication session; the howling removal system detecting a combination of user terminals among the multiple user terminals in which howling occurs based on sound signals collected from the multiple terminals through the voice communication session; and the howling removal system turning off the microphones of one or more user terminals in the combination of user terminals. In this case, the detection signal includes signals in the inaudible frequency band, and the step of turning off the microphones of the user terminals includes controlling the microphones of the user terminals to be off for the audible frequency band while allowing sound in the inaudible frequency band to be input.

In one embodiment, the step of outputting the detection signal includes the howling removal system outputting the detection signal sequentially through the multiple user terminals at predetermined intervals.

In one embodiment, the step of outputting the detection signal includes the howling removal system receiving predetermined environmental change information from the voice communication session and, in response to the reception of the environmental change information, outputting the detection signal through one or more of the user terminals.

In one embodiment, the step of turning off the microphones of the user terminals includes the howling removal system determining the priority of user terminals included in the combination of user terminals based on one or more of the connection information to the voice communication session and previously stored user information. Additionally, the howling removal system includes the step of turning off the microphones of user terminals with relatively lower priority.

In one embodiment, the howling removal method includes the following steps performed by the howling removal system: receiving user input for state transition when a microphone-off state is detected in the user terminal; temporarily storing voice information received from the user terminal in the howling removal system; inspecting whether howling occurs in a combination of user terminals, including the user terminal with the microphone-off state; and, during the inspection step, transmitting delayed audio to the voice communication session using the stored voice information in the howling removal system.

A computer program according to one aspect of the present disclosure is designed to execute a howling removal method based on the embodiments described when combined with hardware. It can be stored on computer-readable media for readability and execution by a computer.

Using the howling removal system and method according to one aspect of the present disclosure, it becomes possible, in environments where multiple users engage in voice communication, such as voice or video conferences, to periodically or under specific conditions, detect combinations of user terminals where howling occurs using detection signals and, in combinations where howling is detected, turn off the microphones of one or more terminals. This allows for the elimination or prevention of howling occurrences.

Furthermore, in the howling removal system and method according to one aspect of the present disclosure, audible frequency band and inaudible frequency band are separated. Even when the microphones of terminals where howling occurs are turned off for the audible frequency band, the system can monitor the occurrence of howling using detection signals in the inaudible frequency band. This allows for taking appropriate measures to ensure communication among users without the occurrence of howling, adapting to changing environments effectively.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
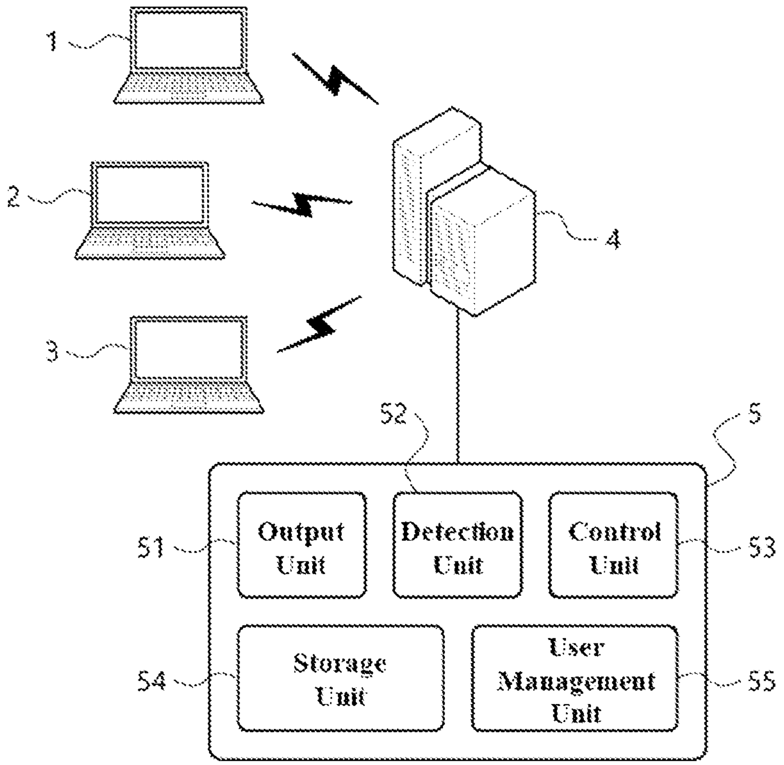
FIG. 1 is an overview block diagram of a howling removal system according to one embodiment.

FIG. 1 is an overview block diagram of a howling removal system according to one embodiment.

Referring to FIG. 1, the howling removal system (5) according to this embodiment is configured to detect and remove howling occurring in an audio communication session to which one or more user terminals (1-3) are connected. In this specification, an audio communication session refers to a communication channel for exchanging data, at least among users. The data transmitted through the audio communication session is not limited to voice but can also include other types of data, such as video data, in conjunction with voice. While audio communication sessions in the embodiments of this specification are described as communication channels for voice or video conferences among participants, it is not limited to such scenarios.

In one embodiment, conference participants can connect to the audio communication session through a communication server (4) that provides audio or video conferencing services. The howling removal system (5) according to the embodiments can be configured to perform howling removal functions for audio data transmitted in conferences as part of the conference service provided by the communication server (4). For example, the operator providing conference services through the communication server (4) and the operator operating the howling removal system (5) may be different entities and can integrate the howling removal function by the howling removal system (5) into the conference service through mutual agreements, among other methods. Alternatively, in other embodiments, the communication server (4) itself may be part of the howling removal system (5), and both the communication server (4) and the howling removal system (5) can be operated by the same entity.

Users of the audio or video conferencing services provided by the communication server (4) can connect to the communication server (4) using user terminals (1-3) and exchange audio streaming data or audio combined with video streaming data with other users connected to the same audio communication session. For these operations, each user terminal (1-3) may include a speaker to output sounds transmitted in the audio communication session and a microphone to receive the voice input of each user. In FIG. 1, each user terminal (1-3) is illustrated as a laptop computer, but the types of devices used by users are not limited to this. For example, users can run applications (or apps) for audio or video conferences on their devices, such as smartphones, tablet computers, laptop computers, personal computers, and the like.

The howling removal system (5) can detect combinations of user terminals (1-3) where howling occurs by outputting detection signals through one or more of the user terminals (1-3) connected to the audio communication session for a conference and by detecting whether howling occurs based on the sound signals collected from each terminal (1-3). Furthermore, the howling removal system (5) can eliminate howling by turning off the microphones of one or more user terminals among the combinations of user terminals determined to be causing howling.

To facilitate these operations, the howling removal system (5) can be connected to user terminals (1-3) and communication server (4) via wired and/or wireless networks. Communication methods through wired and/or wireless networks in this specification may be implemented using any communication method that allows objects to network with each other, and it is not limited to wired communication, wireless communication, 3G, 4G, or any other specific method.

Additionally, the devices described in this specification may be entirely hardware or partially hardware and partially software. For instance, the howling removal system (5) and each system, device, server, and their respective units communicating with it can collectively refer to devices and related software designed for the electronic exchange of data in a specific format and content using electronic communication methods. In this specification, terms such as "unit," "module," "server," "system," "platform," "device," or "terminal" are intended to encompass combinations of hardware and software driven by that hardware. For instance, hardware in this context could be a data processing device that includes a CPU or another processor. Furthermore, software driven by hardware could refer to running processes, objects, executables, execution threads, programs, and more.

In one embodiment, the howling removal system (5) comprises an output unit (51), a detection unit (52), a control unit (53), and further includes a storage unit (54) and a user management unit (55).

It should be noted that in this specification, each unit comprising the howling removal system (5) is not necessarily intended to represent physically distinct components. While they have been illustrated as separate blocks in FIG. 1, this has been done for functional differentiation of the actions performed by the howling removal system (5). In various embodiments, some or all of these units (51-55) can be integrated into a single device or implemented as one or more units physically distinct from one another. For example, each unit (51-55) of the howling removal system (5) may be components connected for communication in a distributed computing environment.

The control unit (53) controls various units included in the howling removal system (5), performs functions such as outputting detection signals to user terminals (1-3), detecting combinations of user terminals (1-3) where howling occurs, and turning off the microphones of one or more user terminals (1-3) in the determined combination.

Specifically, the output unit (51) is configured to output detection signals through user terminals (1-3) connected to the audio communication session. For example, the output unit (51) may be configured to sequentially output detection signals through user terminals (1-3) connected to the audio communication session to find combinations of user terminals (1-3) where howling occurs. While three user terminals (1-3) are shown in FIG. 1, this is merely an illustrative example for the convenience of explanation, and it should be understood that it is not limiting the number of users participating in the conference.

The detection unit (52), after a detection signal has been output to any one user terminal (1-3) by the output unit (51), plays a role in detecting combinations of user terminals (1-3) where howling occurs by using the sound collected from the microphone of each user terminal (1-3) connected to the audio communication session. Once combinations of user terminals (1-3) where howling occurs are detected, the control unit (53) turns off the microphones of one or more user terminals (1-3) included in that combination to prevent future howling.

In this specification, turning off the microphone refers to muting the sound received by the microphone of the respective terminal by reducing its volume to zero. Such an operation can be realized through control functions for each participant in the audio or video conferencing application running on each user terminal (1-3).

In one embodiment, the detection signals for howling removal may utilize frequencies in the inaudible range to ensure that conference participants do not perceive the output of detection signals. This means that the data transmitted and received through the audio communication session can be separated into components in the audible frequency range and components in the inaudible frequency range, with detection signals being output only in the inaudible frequency range. For instance, the audible frequency range refers to components within the frequency range of 20 to 20,000 Hz, while the inaudible frequency range can encompass components above 20,000 Hz, but is not limited to this specific range.

In this case, the control unit (53) can turn off one or more microphones of user terminals (1-3) in the combination of user terminals where howling has occurred for the audible frequency range while keeping them active for the inaudible frequency range. Through this, even when the microphones are turned off based on the detection of the combination where howling occurs, continuous monitoring of the occurrence of howling using detection signals in the inaudible frequency range can still take place. For example, the control unit (53) can control the output unit (51) and the detection unit (52) to perform howling detection again when a period elapses or when specific environmental changes occur. Details about this are explained further with reference to FIGS. 3 and 4.

In one embodiment, the control unit (53), upon receiving user input for transitioning the microphone's state, can reevaluate the occurrence of howling and, if necessary, change the microphone state of the corresponding user terminal (1-3). User input for microphone state transition can include, but is not limited to, sound input with a certain level (e.g., 60 dB) or input through input devices like a mouse or keyboard provided on the user terminal (1-3).

During this process, the storage unit (54) can temporarily store the user's voice information from the moment the user input for microphone state transition is detected until the microphone's state is actually changed. The control unit (53), even when user input for microphone state transition occurs, does not immediately change the microphone state but first conducts howling detection. After taking action based on whether howling occurs or not, it can then use the stored voice information in the storage unit (54) to transmit delayed audio in the audio communication session.

In one embodiment, the control unit (53) can determine priorities for each user terminal (1-3) within the combination of user terminals where howling occurs and can turn off the microphones of user terminals with relatively lower priorities. For example, priorities can be determined based on the connection information of user terminals (1-3) to the audio communication session. Connection information can include timestamps related to when the user terminal connected to the audio communication session, when it last transmitted audio signals in the session, and similar data. For instance, user terminals that connected to the conference room first or those that input audio signals most recently could be assigned higher priorities. However, the method of determining priorities is not limited to this.

In one embodiment, the priorities among user terminals within the combination where howling occurs can be determined based on pre-stored user information. For this purpose, the user management unit (55) can include user information related to each user participating in the audio or video conference. User information can encompass details such as the location information of each user participating in the conference, the types of devices (user terminals 1-3) each user is using, affiliation information like job titles or departments of each user, and contribution information regarding each participant's level of involvement in the conference. Detailed explanations regarding priority determination based on user information will be provided later.

Figure 2:
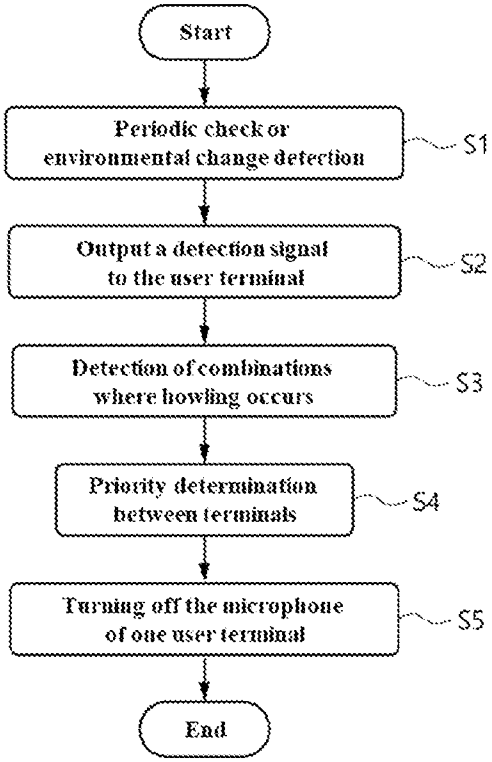
FIG. 2 is a flowchart illustrating the steps of a howling removal method according to one embodiment.

FIG. 2 is a flowchart illustrating the steps of the howling removal method according to one embodiment. For the convenience of explanation, the howling removal method according to this embodiment will be described with reference to FIGS. 1 and 2.

First, the control unit (53) of the howling removal system (5) can determine whether howling needs to be inspected based on whether a pre-set interval has elapsed or whether a pre-set environmental change in the audio communication session has been detected (S1). For example, the control unit (53) can be configured to inspect for howling at regular time intervals. Alternatively, in other embodiments, the control unit (53) can detect environmental changes based on conditions such as the entry of new participants, the exit of existing participants, the input of sounds of a certain magnitude to user terminals where the microphone was previously turned off, or participants forcing microphone state transitions.

When two or more conference participants are in the same location with all of them having their user terminal microphones (1-3) turned on, howling may occur if the same sound is input with a slight time difference into multiple microphones, resulting in a repeating pattern of the same input or the generation of high-frequency noise. However, it is impossible to know which combination of user terminals (1-3) is causing the howling. Therefore, when the predefined interval has elapsed or when an environmental change is detected, the output unit (51) of the howling removal system (5) can sequentially output detection signals through each user's user terminal (1-3) participating in the audio communication session (S2).

Next, the detection unit (52) of the howling removal system (5) can detect combinations of user terminals (1-3) where howling occurs by monitoring the sounds input to other user terminals (1-3) after a detection signal has been output through one of the user terminals (1-3) (S3). For example, based on the example provided in Table 1 below, the detection unit (52) can determine that a combination of user terminals, such as User Terminal 1 and User Terminal 2, is causing howling.

TABLE 1

| The presence of howling (Row: Output Terminal, Column: Detection Terminal) | User Terminal 1 | User Terminal 2 | User Terminal 3 |
|---|---|---|---|
| User Terminal 1 | — | ○ | X |
| User Terminal 2 | ○ | — | X |
| User Terminal 3 | X | X | — |

In one embodiment, for the purpose of howling detection, the detection signals output are signals in the inaudible frequency range, allowing the howling detection to be performed without conference participants hearing the detection signals. For instance, signals in the inaudible frequency range, such as those above approximately 20,000 Hz, can be used as detection signals. These detection signals may have preconfigured sound levels and/or sound patterns to clearly detect howling generated when the signal is input into the microphones of other terminals. For example, sound patterns in the form of Morse code with a sound level of at least 40 dB can be used as detection signals, but this is not limiting.

Next, the control unit (53) can take measures to turn off the microphones for one or more terminals except for one terminal in the combination of user terminals (1-3) detected to be causing howling (S5). In addition, in this case, the control unit (53) can keep the microphone in a state where it can receive sound for the inaudible frequency range and turn off the microphone only for the audible frequency range. This ensures that even for terminals with their microphones turned off, howling detection using the inaudible frequency range detection signals can continue.

In one embodiment, the control unit (53) can determine the priority among terminals in the combination of user terminals (1-3) detected to be causing howling to decide which terminal's microphone to keep active (S4). For example, the terminal that most recently input an audio signal in the audio communication session can have a relatively higher priority. If howling occurs in a combination that includes this terminal, the microphones of the other terminals in that combination can be turned off. Alternatively, the terminal that connected to the session first can have a relatively higher priority. If howling occurs in a combination that includes this terminal, the microphones of the terminals that connected later to the conference room can be turned off.

Below, an illustrative scenario is described in which howling detection is performed based on the detection of environmental changes.

In one embodiment, the howling removal system (5) can perform howling detection in response to the entry of a new conference participant. Specifically, when the first participant opens the conference room (audio communication session), and the second participant enters, howling detection can be initiated from the moment of the second participant's entry request until the moment just before their entry is displayed. In this context, the entry request moment refers to the point in time when a user completes their settings for the conference, including their display name, microphone on/off status, video on/off status, etc., and requests access. The entry display moment refers to the point at which the names, display names, video, and other information of this user are exposed to other participants in the conference room.

Furthermore, in one embodiment, the howling removal system (5) can perform howling detection in response to the departure of existing conference participants. In other words, after howling detection and actions regarding the existing conference participants have been completed, if a specific participant ends the conference (by disconnecting from the audio communication session), the system will perform howling detection again to adapt to the changed environment. Otherwise, only the participants whose microphones were turned off as part of the howling removal actions for the existing combination may remain.

Furthermore, in one embodiment, the howling removal system (5) can reperform howling detection and removal actions if a microphone of a user terminal (1-3) that was previously turned off as part of the existing howling removal measures generates sound above a certain level (e.g., 60 dB). Details of this process are explained in reference to FIG. 3.

Figure 3:
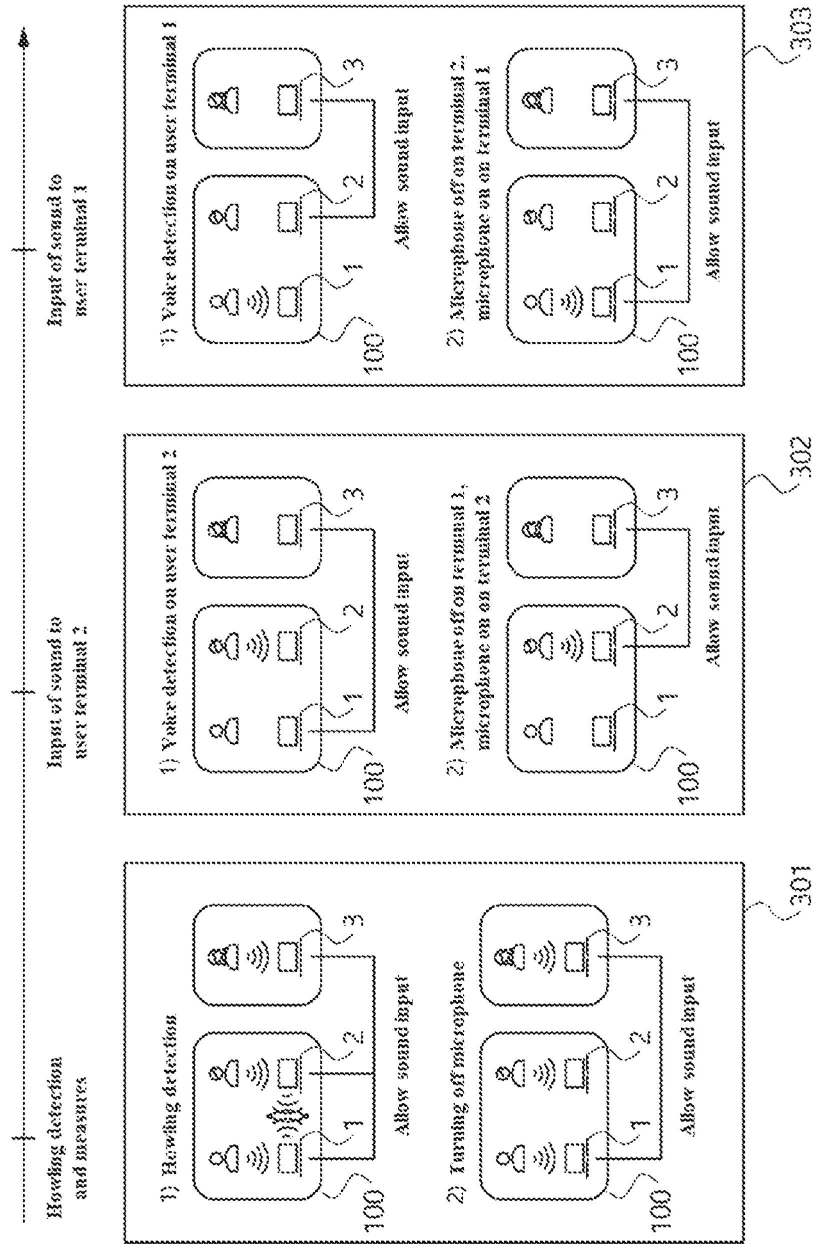
FIG. 3 is a conceptual diagram illustrating actions based on environmental changes in a howling removal method according to one embodiment.

Referring to 301 in FIG. 3, let's assume a scenario where the first user terminal (1) and the second user terminal (2) among the user terminals (1-3) participating in the meeting are in the same physical space (100). In this scenario, howling occurs when sound generated from either the first or second user terminal (1-2) is picked up by the microphone of the other terminal. In response, the howling removal system identifies the combination of user terminals (1-2) where howling is occurring and turns off the microphone of the second user terminal (2) while allowing sound input to the microphones of the first and third user terminals (1, 3) to remove the howling.

In this scenario, as depicted in 302 of FIG. 3, if a sound input of a certain magnitude (e.g., 60 dB) or greater occurs on the microphone that has been turned off on the second user terminal (2), the howling removal system can interpret this as a user input for microphone state transition and switch on the microphone of the second user terminal (2). The threshold for sound input to trigger microphone state transition can be set to a typical adult conversation sound level, but this is not limited to that level.

When transitioning the microphone of the second user terminal (2) to the "on" state, in order to prevent howling from occurring, the first user terminal (1) in the same space (100) that causes howling should have its microphone turned off. Meanwhile, the microphones of the second user terminal (2) and the third user terminal (3) are allowed to have sound input. In this state, by outputting a detection signal to the second user terminal (2), the system can initiate a re-examination of the user terminal combination where howling occurs. However, in accordance with the example, it is also possible to turn off the microphone of the first user terminal (1) without further exploration based on the previously detected user terminal combination where howling occurs.

In the illustrated embodiment, even when a sound input of a certain size or greater occurs, the howling removal system does not immediately turn on the microphone of the second user terminal (2). Instead, it can transmit the delayed form of the recorded voice input from the microphone of the second user terminal (2), which had the sound input, to other participants after taking measures to prevent howling. In other words, in response to a sound input of a certain size or greater, the howling removal system stores the voice input received by the microphone of the second user terminal (2) for at least a temporary period. After taking measures to prevent howling, such as turning off the microphone of the first user terminal (1) and switching on the microphone of the second user terminal (2), the stored voice information can be transmitted with latency to the voice communication session.

Subsequently, as indicated in 303 of FIG. 3, if a sound of a certain size or greater is input to the first user terminal (1) while the sound input is allowed on the second user terminal (2), the howling removal system can perform the opposite process of what was done in 302. It can turn off the microphone of the second user terminal (2) and switch on the microphone of the first user terminal (1) to allow sound input. This allows the prevention of howling by synchronizing the microphone on/off actions of each user terminal while sound is simultaneously input to the terminals in the same space (100) as users speak in the conference room.

Furthermore, in this embodiment, the howling removal system (5) can perform howling detection and removal actions again when a participant voluntarily switches the microphone state in a combination of user terminals (1-3) where the previous howling removal measures have been completed. This assumes the premise of switching the microphone state in accordance with the participant's request. For details on this, please refer to FIG. 4.

Figure 4:
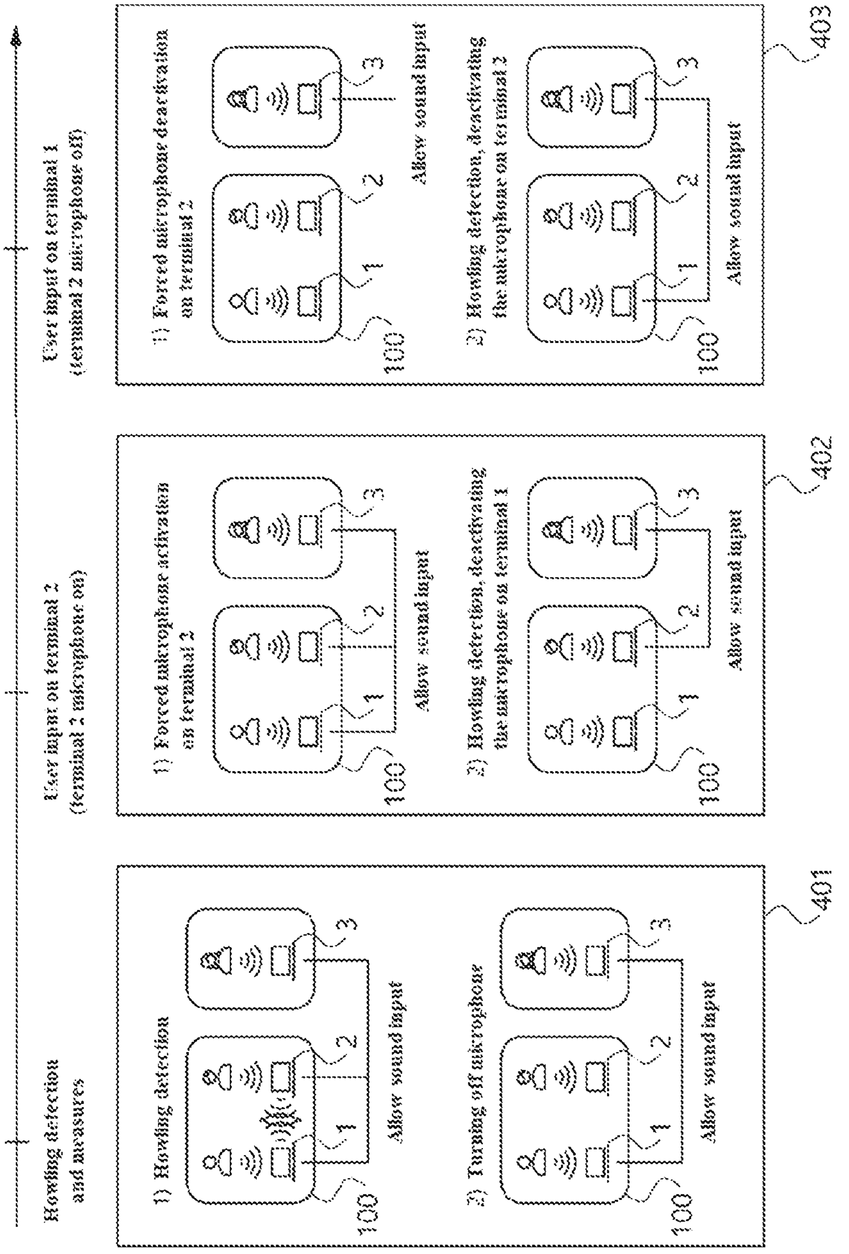
FIG. 4 is a conceptual diagram illustrating actions based on environmental changes in another embodiment of a howling removal method.

Referring to 401 of FIG. 4, it is assumed that in a scenario where users' terminals (1-3) are participating in a meeting, and user terminal 1 and user terminal 2 are in the same physical space (100), the microphone of user terminal 2 is turned off to prevent howling while allowing sound input to the microphones of user terminals 1 and 3.

In this state, as shown in 402 of FIG. 4, it is possible for user input (such as key presses, mouse clicks, etc.) to trigger a forced microphone state transition on user terminal 2, which has its microphone turned off. In this scenario, the howling removal system can respond to the user input by switching the microphone of user terminal 2 back on. However, to prevent howling, it may simultaneously turn off the microphone of user terminal 1, which is in the same physical space (100) as user terminal 2. In this process, by outputting a detection signal to user terminal 2, the system can re-examine the combination of user terminals causing howling, and it can turn off the microphone of user terminal 1, which is causing the howling, either through a new search process or by referencing the information of previously detected terminal combinations.

Also, similar to what was described by referring to FIG. 3, after a user input for state transition, the voice information input to user terminal 2 can be stored and then transmitted as delayed audio to the voice communication session after howling detection and/or howling-related actions are completed.

Subsequently, as shown in 403 of FIG. 4, if the user of user terminal 2 forcibly turns off the microphone with user input, the howling removal system can turn off the microphone of user terminal 2 as per the user's input. However, for user terminal 1, which had its microphone turned off due to howling caused by user terminal 2, the system can turn its microphone back on. In this case, the system can also perform a new search for the combination of user terminals causing the howling by outputting a detection signal to user terminal 2.

In the described embodiment, the howling removal system determines the priorities among user terminals based on user information related to each conference participant. This user information may include the type of device used by each user terminal, the user's position or department, the contribution level of each participant to the conference, and similar affiliation details. Based on these factors, the system can decide which user terminal to turn off the microphone for in the combination of user terminals where howling is occurring, following the established priorities.

For example, the howling removal system stores the type of device used by each conference participant's user terminal (1-3) as user information, and based on pre-defined priorities for each type of device, it can determine which user terminal (1-3) to turn off the microphone for when howling occurs. For instance, priorities can be set in advance among device types, giving higher priority to personal computers (PCs), compared to smartphones. However, this is not limited to these specific examples.

As another example, the howling removal system can store information about the positions or departments of each conference participant in advance and, based on the affiliation information of participants, assign priorities to each user terminal (1-3). This allows it to determine which terminal to turn off the microphone for when howling occurs. For instance, when howling occurs, the system can prioritize keeping the microphones on for users with higher-ranking positions and turning off the microphones for users with lower-ranking positions. Alternatively, when establishing a voice communication session through the communication server (4), the system can receive information about the organizer's department. In the event of howling, it can prioritize keeping the microphones on for user terminals belonging to participants in the same department as the organizer and turning off the microphones for participants from different departments.

Another example is that the communication server (4) can allow the organizer to set the contribution level of each participant when establishing a voice communication session or require each participant to input their contribution level when joining the voice communication session. In the event of howling, the system can assign priorities based on the configured contribution levels for each participant, where participants with relatively higher contribution levels have their microphones kept on, and those with relatively lower contribution levels have their microphones turned off. However, the method of assigning priorities based on user information can vary in the embodiments and is not limited to what is described in this specification.

The operations described in the above examples of the howling removal method can be at least partially implemented as a computer program and can be recorded on a computer-readable medium. A computer-readable medium for recording a program for implementing the operations according to the embodiments includes all types of recording devices in which data that can be read by a computer is stored. Examples of computer-readable media include ROM, RAM, CD-ROM, magnetic tapes, floppy disks, optical data storage devices, and more. Additionally, computer-readable media can be distributed across computer systems connected via a network, where code that can be read by computers is stored and executed in a distributed manner. Furthermore, the functional programs, code, and code segments for implementing this embodiment will be readily understandable by those skilled in the art of the relevant technical field.

Furthermore, each block or step depicted in the flowcharts of this specification may represent one or more executable instructions forming part of a module, segment, or code that executes specific logical functions. Additionally, in various alternative embodiments, the functions mentioned in the blocks or steps may occur out of sequence. For example, two blocks or steps shown sequentially may actually be performed concurrently, or the blocks or steps may be performed in reverse order at times, depending on the functionality in question.

A howling removal system according to the present disclosure includes an output unit configured to output a detection signal through any one of a plurality of user terminals connected to a voice communication session, each equipped with a microphone; a detection unit configured to detect a combination of user terminals among the plurality of user terminals in which howling occurs based on sound signals collected from the plurality of terminals through the voice communication session; and a control unit configured to turn off the microphone of one or more user terminals included in the combination of user terminals.

In this case, the detection signal includes a signal in the inaudible frequency range, and the control unit is further configured to control the microphone of the user terminals in the audible frequency range to be turned off while allowing sounds in the inaudible frequency range to be input.

By using the howling removal system described above, in environments where multiple users exchange audio, such as voice or video conferences, the system can periodically or under specific conditions detect combinations of user terminals where howling occurs using detection signals. It can then remove or prevent howling by turning off the microphones of one or more terminals in combinations where howling occurs.

The above description has been provided with reference to the embodiments illustrated in the drawings, but this is merely exemplary, and those skilled in the art will understand that various modifications and variations are possible from it. However, such modifications should be considered within the technical scope of the present disclosure. Therefore, the true technical scope of the present disclosure should be determined by the technical concept of the appended claims.

The invention claimed is:

1. A system for detecting and removing howling comprising:

an output unit configured to output a detection signal through one of a plurality of user terminals each having a microphone and connected to a voice communication session;

a detection unit configured to detect a combination of user terminals among the plurality of user terminals that generate howling, based on sound signals collected from the plurality of terminals through the voice communication session; and a control unit configured to turn off a microphone of one or more user terminals included in the combination of user terminals, wherein the voice communication session is for transmitting and receiving data including both components of an audible frequency band and components of an inaudible frequency band, the detection signal includes a signal of an inaudible frequency band having one or more of a pre-set volume pattern and a pre-set sound pattern, and wherein the control unit is configured to control the microphone of the one or more user terminals in a state where sound of the inaudible frequency band is input while turning off the microphone for an audible frequency band, the control unit is configured to control the output unit to output the detection signal through one of the plurality of user terminals while the microphone of the one or more user terminals is turned off for the audible frequency band, and the control unit is further configured to control the detection unit to re-detect a combination of user terminals generating howling among the plurality of user terminals using sound of the inaudible frequency band collected through the voice communication session when the microphone of the one or more user terminals is turned off for the audible frequency band.

2. A system for detecting and removing howling according to the claim 1, wherein the control unit is configured to sequentially control the output unit to output the detection signal through the plurality of user terminals at pre-set intervals.

3. A system for detecting and removing howling according to the claim 1, wherein the control unit is configured to receive a pre-set environmental change information from the voice communication session and to control the output unit to output the detection signal through one or more user terminals in response to the received environmental change information.

4. A system for detecting and removing howling according to the claim 1, wherein the control unit is configured to determine a priority of user terminals included in the combination of user terminals based on one or more of the connection information to the voice communication session and previously stored user information for the voice communication session and to turns off the microphone of user terminals with relatively low priority.

5. A system for detecting and removing howling according to the claim 1, further comprising a storage unit configured to temporarily store voice information received from the user terminals, wherein the control unit is further configured to, when a user input for a state transition is received from the user terminal where the microphone is turned off, check whether howling occurs in a combination of user terminals including the user terminal where the microphone is turned off using the detection unit, and to transmit delayed audio to the voice communication session using the stored voice information in the storage unit.

6. A method of removing howling, comprising:

a step of outputting a detection signal through one of a plurality of user terminals each having a microphone and connected to a voice communication session;

a step of detecting a combination of user terminals among the plurality of user terminals that generate howling through one user terminal connected to the voice communication session, based on sound signals collected from the plurality of terminals through the voice communication session; and a step of turning off a microphone of one or more user terminals included in the combination of user terminals, wherein the voice communication session is for transmitting and receiving data including components of an audible frequency band and components of an inaudible frequency band, the detection signal includes a signal from an inaudible frequency band that has one or more of a pre-set volume pattern and a pre-set sound pattern, wherein the step of turning off the microphone comprises controlling the microphone of the one or more user terminals in a state where sound of the inaudible frequency band is input while turning off the microphone for an audible frequency band, the method of removing howling further comprising:

the step of controlling any one of the plurality of user terminals to output the detection signal when the microphones of one or more user terminals among the plurality of user terminals are turned off for the audible frequency band, and the step of re-detecting a combination of user terminals generating howling among the plurality of user terminals using sound of the inaudible frequency band collected through the voice communication session when the microphone of the one or more user terminals is turned off for the audible frequency band.

7. The howling removal method according to claim 6, wherein the step of controlling one of the plurality of user terminals comprises sequentially outputting the detection signal through the plurality of user terminals at predetermined intervals.

8. The howling removal method according to claim 6, wherein the step of controlling one of the plurality of user terminals comprises:

receiving predetermined environmental change information from the voice communication session and, and in response to the reception of the environmental change information, outputting the detection signal through one or more of the user terminals.

9. The howling removal method according to claim 6, wherein the step of turning off the microphones of the user terminals comprises:

determining the priority of user terminals included in the combination of user terminals based on one or more of the connection information to the voice communication session and previously stored user information, and turning off the microphones of user terminals with relatively lower priority.

10. The howling removal method according to claim 6, further comprising:

the step of storing voice information at least temporarily received from the user terminal in the howling removal system; and the step of checking whether howling occurs in a combination of user terminals, including the user terminal where the microphone is turned off; and the step of transmitting delayed audio to the voice communication session using the stored voice information during the checking step.

11. A computer program stored on a non-transitory computer-readable medium for performing a howling removal method according to claim 6, in combination with hardware.

* * * * *